United States Patent
Daansen

(10) Patent No.: US 6,394,316 B1
(45) Date of Patent: May 28, 2002

(54) BUBBLE PUMP FOR DISPENSING PARTICULATE-LADENED FLUID

(76) Inventor: Warren S. Daansen, P.O. Box 614, Nashua, NH (US) 03061

( * ) Notice: Subject to any disclaimer, the term of this patent is extended or adjusted under 35 U.S.C. 154(b) by 0 days.

(21) Appl. No.: 09/768,825

(22) Filed: Jan. 24, 2001

Related U.S. Application Data

(63) Continuation-in-part of application No. 09/383,832, filed on Aug. 27, 1999, now Pat. No. 6,286,732.
(60) Provisional application No. 60/257,433, filed on Dec. 22, 2000, and provisional application No. 60/098,347, filed on Aug. 28, 1998.

(51) Int. Cl.[7] .............................................. B65D 37/00
(52) U.S. Cl. ....................................... 222/207; 222/209
(58) Field of Search ................................... 222/207, 209

(56) References Cited

U.S. PATENT DOCUMENTS

| | | | |
|---|---|---|---|
| 3,162,333 A | * | 12/1964 | Davidson .................... 222/207 |
| 4,130,224 A | | 12/1978 | Norman et al. |
| 4,143,853 A | | 3/1979 | Abramson |
| 4,394,938 A | | 7/1983 | Frassanito |
| 4,512,501 A | | 4/1985 | Foster |
| 4,515,294 A | | 5/1985 | Udall |
| 4,603,793 A | | 8/1986 | Stern |
| 4,607,764 A | | 8/1986 | Christine |
| 4,621,749 A | | 11/1986 | Kanfer |
| 4,705,195 A | | 11/1987 | Heck |
| 4,722,372 A | | 2/1988 | Hoffman et al. |
| 4,867,347 A | * | 9/1989 | Wass et al. ................. 222/207 |
| 4,878,774 A | | 11/1989 | Karasin et al. |
| 4,887,742 A | | 12/1989 | Roethel et al. |
| 5,265,772 A | | 11/1993 | Bartasevich et al. |
| 5,401,148 A | | 3/1995 | Foster et al. |
| 5,452,826 A | | 9/1995 | Stern |
| 5,501,372 A | | 3/1996 | Daansen |

OTHER PUBLICATIONS

GOJO Industries Inc, photograph, PRO 2000 Natural Orange Hand Cleaner Dispenser Stock No. 7255.
GOJO Industries Inc, photograph, PRO 2000 Natural Orange Hand Cleaner Dispenser Stock No. 7265.
GOJO Industries Inc, photograph, PRO 2000 Natural Orange Hand Cleaner Dispenser Stock No. 7295.
Sterisol System 2000, brochure, Sterisol AB, Vadstena, Sweden.
GOJO, brochure, # NXT–LIT–FAM1, 02/2000, GOJO Industries Inc., Akron, Ohio, USA.
GOJO NXT, brochure, # NXT–LIT–MAXI1, 02/2000, GOJO Industries Inc., Akron, Ohio, USA.
GOJO NXT, brochure, # NXT–LIT–SPC1, 02/2000, GOJO Industries Inc., Akron, Ohio, USA.
GOJO NXT, brochure, # NXT–LIT–SBS1, 02/2000, GOJO Industries Inc., Akron, Ohio, USA.
Highland Laboratories Inc, operating instructions and parts list for model 480 dispenser, Feb. 15, 1993, Highland Laboratories Inc, Ashland, Massachusetts, USA.

* cited by examiner

*Primary Examiner*—Philippe Derakshani
(74) *Attorney, Agent, or Firm*—Vernon C. Maine; Scott J. Asmus

(57) ABSTRACT

A pump for dispensing particulate-ladened or heavily viscous fluids such as grit-ladened or granulated hand soap or lotion, has a compressible pump cavity with an inlet and a streamlined outlet, with a backflow check valve associated with the inlet and a nozzle assembly connected to the outlet. In the nozzle assembly, a spring loaded outflow ball valve resists outflow until sufficient fluid pressure is applied from the pump cavity. A minimally flow restrictive spring base support structure holds the base of the spring apart from the nozzle tip, creating a fluid flow path around the check ball and spring to the nozzle tip.

8 Claims, 12 Drawing Sheets

BUBBLE PUMP FOR DISPENSING PARTICULATE-LADENED FLUID

CROSS REFERENCE TO RELATED APPLICATIONS

This application claims priority to U.S. application serial no. 60/257,433, filed Dec. 22, 2000, and is a continuation in part to U.S. Ser. No. 09/383,832 now U.S. Pat. No. 6,286,732 filed Aug. 27, 1999, issued Sep. 11, 2001, which claimed priority to U.S. application serial no. 60/098,347 filed on Aug. 28, 1998.

BACKGROUND OF THE INVENTION

1. Field of the Invention

The present invention relates to an improved pump and nozzle for a fluid dispensing apparatus, more specifically, a collapsible cavity pump with an improved outflow valve assembly having an less restricted fluid flow path and greater area of flow capacity through the pump tip.

2. Background Art

Liquid and semi-liquid dispensers are used in numerous applications and are used to dispense metered portions of creams, lotions, soaps, and similar materials. A typical dispenser allows the user to obtain a specific amount of liquid matter with minimal ease. Manual and automatic dispensing systems are common in the industry.

Manual dispensers generally utilize levers and other mechanical assemblies wherein the user must provide some physical contact with the dispensing unit in order to expel a unit of liquid. Automatic dispensers are becoming increasingly popular, and operate with a variety of electrical and electro-mechanical components to automatically dispense the liquid after triggering some sensory input. Once the sensor mechanism is triggered, a mechanical means is still required to force out a metered quantity of liquid.

Within the field of liquid dispensers, there are many types of dispensers. The most common and cost effective is the bag-in-box system, where the liquid comes in a disposable no-leak pouch or bag, to which is fused a pump and outflow tip. This system is a closed system; all air is removed from the pouch during manufacturing. This helps prevent contamination of the soap supply. The bag collapses upon itself as the liquid is consumed, and when empty, the bag and pump are disposed of and replaced by a new one. The closed system has many advantages, including convenience and better sanitation. Several size pouches are common, including 800 ml, 1000 ml and 1200 ml; the size requirement being dictated by the size and capacity of the dispenser in which it is to be used.

It is a necessary requirement that the cost to produce a bag-in-box system be kept to a minimum, while still delivering consistently reliable performance. Soap dispensers are commonly installed in public facilities and are subject to extreme wear and tear, thus they must also be robust and relatively maintenance-free. As a disposable element of the system, a malfunctioning or defective bag and pump are simply discarded, along with any remaining liquid soap in the bag.

Other dispensers use cartridges or refillable containers. The cartridges must be pierced, are generally not refillable, and produce greater waste. Both cartridges and re-fillable containers introduce air into the system, aiding the production of bacteria and mold. The cost and administrative complexity in using these other forms of dispensers, as well as the decreased sanitary condition limits their market appeal. Regardless of the type of housing for the liquid, whether pouch, canister, cartridge or container, the liquid must still be dispensed through a dispenser valve assembly.

The liquid soap industry has numerous brands and categories of soaps. The viscosity and particulate content are also subject to extreme variations. There is an array of particulate matter that can be added to liquid soaps to form a grit soap compound that is more effective in cleaning. The most common grit material is plastic microspheres, although other materials such as clay, walnut shells and corn cobs have also been used. Besides the variations of compounds used to form grit soap, the size of the grit also varies.

There are several lines of liquid soaps with synthetic particles, namely plastic balls, that constitute grit compounds. The size of the particulate varies, and a series of products include Microgrit 40, Microgrit 60, and Microgrit 70. The increased consumer demand for grit in liquid soaps has led to an increase in malfunctions in existing dispensers.

There has also been a consumer demand for antimicrobial soaps, and the industry has reacted by adding creating new compounds with anti-bacterial properties. These antimicrobial soaps are available with or without grit and have certain characteristics and viscosity differences as compared to standard liquid soap.

Besides liquid soap, other compounds that are used in liquid dispensers include body and hair shampoo, hand cream solutions, lotion soaps, and shaving cream. Any flowable liquid is capable of being dispensed. Prior art designs are generally not effective in dispensing viscous liquids.

In a typical bag-in-box operation, a user depresses a lever or controller. This applies pressure to the liquid in the collapsible pouch that exerts fluid pressure against the ball in the ball check valve. If the pressure is sufficient, the ball is displaced, and the liquid flows around the ball and into the ball check valve chamber. The liquid flows into the space between the spring and the interior wall of the ball check valve chamber. Once the chamber is sufficiently full, the liquid is forced through the compressed spring and out through the lower fitment hole and through the nozzle.

Many of the current dispensers cannot adequately handle the grit, grit compounds, or viscous liquids. The dispenser valves have a narrow point or restricted passage that limits the size of the particulate matter that can pass freely and generally impedes viscous liquids. In most cases, this narrow area is directly before the exit nozzle, at the spring seat.

A common problem with most bag-in-box dispensers is that the dispenser valve tends to clog and become unusable after a number of manipulations. Once the pump tip becomes clogged, the entire pouch and pump tip is normally thrown out, regardless of the amount of liquid remaining in the pouch. The expenditure in time and materials is significant due to the number of dispensers in the market.

In order to reduce the aforementioned problems, attempts have been made to produce an efficient and cost-effective dispensing system. The prior art systems have general short-comings and do not adequately address or correct these problems.

The pump tip in U.S. Pat. No. 5,501,372 is an improved tip design, but as shown in FIG. 5, the liquid has a limited exit point that restricts the liquid flow. The spring contacts the flush spring seat, creating a bottleneck in the dispensing process. The liquid is substantially forced through the center of the spring in order to exit out of the nozzle tip. In addition, the flat surface of the spring seat provides a surface for collecting debris and otherwise facilitating clogging of the nozzle, especially when particulate matter is mixed with the liquid.

U.S. Pat. No. 4,130,224 is another dispensing apparatus, wherein the ball check valve is held in place by a spring, with the spring seat perpendicular to the spring, as illustrated in FIGS. 3, 4, 5, and 6. When the lever is pressed, the fluid is compressed, creating a pressure that exceeds the spring tension. The ball is forced away from the ball seat and fluid flows around the ball and into the inner chamber. The exit nozzle is smaller in dimension than the diameter of the inner chamber, and the spring seat is on the upper end of the exit nozzle, with the spring contacting the spring seat. The liquid must go through the spring to exit the nozzle.

A similar ball check valve is disclosed in FIG. 5 of U.S. Pat. No. 4,394,938 ('938), wherein the '938 invention depicts the arrangement of the ball contacting the ball seat, and held in place by the spring. The spring is perpendicular to the spring seat, which is a substantially flat surface. When the ball is displaced from the ball seat, the liquid is forced around the ball. The path of the liquid is primarily down the cross sectional area outside the spring until the liquid contacts the flattened surface of the spring seat, where the liquid is then forced to exit through the center of the spring.

A similar ball check arrangement is shown in FIG. 10 of U.S. Pat. No. 4,515,294. The spring is retained within a tube, and a smaller diameter inner tube forms the lower end of the spring seat. Once the ball is displaced from the ball seat, the liquid flow is obstructed and must be diverted through the center of the spring before it enters the inner tube. In yet another dispenser device, U.S. Pat. No. 4,722,372 in FIG. 7 shows the spring seat flush and perpendicular to the spring as in previous examples.

U.S. Pat. No. 4,621,749 shows another ball check valve, where the lower end of spring chamber has a slight angle at the lower portion as shown in FIG. 10. However, the liquid must still flow around the spring in order to exit the cavity. In addition, the location of the angle is at a point where the flow is already restricted. Another example of an angled portion is shown U.S. Pat. No. 5,265,772 in FIG. 9. In both these figures, the bottom coil was not flat, but was angled like the other coils and seated in the chamber accordingly. Neither discloses nor suggests any significance relating to fluid flow characteristics, and neither discusses or infers any advantages to angled chamber design or elevated standoffs.

A different valve dispensing assembly is illustrated in U.S. Pat. No. 4,143,853, wherein a rubber disc with a slit is used as the means of gating the liquid flow. In operation, the normally closed slit is opened when a force is applied to the edges of the disc by the engaging assembly located on the outer periphery of the disc. In this invention, the planar seat surfaces are required in order to function properly. This invention is specifically intended for use as a catheter. U.S. Pat. No. 4,394,938 employs a similar design, wherein a slit diaphragm is used as the gating mechanism for dispensing metered portions.

Another design is disclosed in U.S. Pat. No. 4,607,764, where an elastomeric band functions as the check valve and allows a metered portion of liquid to be dispensed. This invention creates a flow channel by having specific openings and indents within which the fluid passes.

There remains a problem in the art with respect to a dispenser pump and tip design that eliminates the restriction and obstructions to the flow of particulate-ladened or heavily viscous liquid flow.

Many of the pump systems in the art utilize a collapsible hose, the upper and lower ends of which are equipped with an inflow and outflow check valve. A press bar is pressed against the hose, collapsing the hose and expelling a unit measure of liquid soap out the outflow into the user's hands. When the press bar is relaxed, the hose recovers its normal shape and volume, refilling itself with liquid soap through the inflow check valve from the bag of soap to which it is attached.

A further development of the bag-in-a-box system has been the adaptation of collapsible bulb pumps, as is evident in the prior art GoJo NXT™ and the Sterisol System 2000™ liquid soap dispensing systems. Each uses a semi-spherical collapsible bubble, bulb or dome mounted on a backplate, which is fused to a disposable bag of liquid soap. The backplate incorporates an inflow check valve communicating with the bag, and an outflow check valve and pump tip from which soap is dispensed into the user's hands. Depression and recovery of the bubble or dome, either by a press bar or directly by hand, performs the same function as the collapsing and recovery of the pump hose in the other prior art systems described above. The bag and bubble pump fit into their compatible dispensers in the same general manner as the bag and hose pump of the alternative systems. The prior comments about the addition of grit or particulate matter and other additives to liquid soap for improved scrubbing and cleaning performance apply to the soaps used in both hose pump and bubble pump systems.

Collapsible bubble, bulb and dome pumps are also represented in related fields, as demonstrated by Stern's U.S. Pat. No. 5,452,826, issued Sep. 26, 1995, for a Proportioning Arrangement for Dispensing Portions of Liquid Foodstuff from a Foodstuff Container.

SUMMARY OF THE INVENTION

The invention, simply stated, is a pump for dispensing particulate-ladened or heavily viscous fluids such as grit-ladened or granulated hand soap or lotion, with a compressible pump cavity with an inlet and a streamlined outlet, and with a backflow check valve associated with the inlet and a nozzle assembly connected to the outlet. In the nozzle assembly, a spring loaded outflow ball valve resists outflow until sufficient fluid pressure is applied from within the pump cavity. A minimally flow restrictive spring base support structure holds the base of the spring apart from the nozzle tip, permitting fluid flow around the check ball and spring to the nozzle tip.

It is therefore an object of the invention to provide a collapsible bubble pump and tip design with a less restricted and greater cross sectional flow through the nozzle chamber into the outflow tip or nozzle. This eliminates the need for the fluid to be forced through check valve spring coils into the spring center to reach the nozzle, as in some prior art designs, and greatly increases the flow capacity of the dispenser. An additional objective of the invention is to provide a dispenser system with the ability to handle particulate-ladened and heavily viscous liquids, and to reduce the clogging evident in present designs. A yet further objective is to reduce the parts count of a soap pump and tip assembly. A still yet further objective of the invention is to combine the unibody construction of a bubble pump on a backplate with an improved flow pump tip for particulate-ladened and heavily viscous fluids.

Another additional object is to provide a streamlined flow path for the liquid flow from the pump cavity to the nozzle tip. Yet another object is to provide a soap pump with fewer obstructions or restrictions in the flow path through nozzle chamber by incorporating elevated standoffs for the spring seat. A still further object is to provide standoffs aligned with the direction of fluid flow so as to minimize fluid turbulence and direct the fluid flow out the nozzle tip.

Another object is to increase efficiency and reliability of soap dispensing systems by reducing the number of clogged dispensers. Most bag-in-box soap dispensers cannot be easily adjusted or repaired once the pump nozzle becomes clogged; and the bag and remaining soap must be thrown away along with the soap pump. The present invention possesses a high commercial value because it also significantly reduces the amount of wasted product and maintenance.

An additional object of the invention is to limit the clogging effect of the turns of the coil spring in the outflow check valves of the prior art on particulate-ladened or heavily viscous fluids.

An object of the invention is to provide a soap pump utilizing a collapsible, semi-spherical, resilient bubble mounted on a backplate having an inflow port and check valve attachable to a collapsible bag and an outflow port communicating with a dispensing nozzle. The nozzle has a check valve chamber with an inflow end and a dispensing tip end, a ball seat at the inflow end, a ball contacting the ball seat, and a coil spring within the chamber, one end of which urges the ball against the seat. The diameter of the coiled spring is sufficiently smaller than that of the chamber so as to provide a longitudinal fluid flow path in the ball seat, around the ball, and through the chamber external to the spring. There is within the chamber means for suspending the lower end of the coil spring in compression against the ball, elevated above the tip end of the chamber so that the fluid flow path does not require fluid to penetrate spring wall between the coils in order to reach the nozzle tip.

Another object is a soap pump as described above where the means of supporting the check valve spring is a plurality of uniformly distributed standoff legs or fins extending radially inward from the wall of the nozzle check valve chamber near the tip, each incorporating a notch or step which collectively function to retain the lower end of the coil spring in a centered position in the chamber. The legs would elevate and support the spring above the dispensing tip and provide a low drag profile to the fluid flow path passing from around the spring downward to the nozzle tip.

Yet a further object is a valve dispensing assembly, wherein the nozzle tip end of the chamber is funnel shaped. And yet another further object of the invention is to provide a rigid backplate diaphragm pump with improved fluid dynamics and reduced flow path resistance in the fluid flow path and valves.

Other objects, features and advantages are apparent from description in conjunction with the accompanying drawings.

DESCRIPTION OF THE PREFERRED EMBODIMENT

As will be readily apparent to those skilled in the art, the invention is susceptible of many embodiments. The following describes only a preferred embodiment, and should not be construed as limiting of the scope of the invention in any way.

FIGS. 1–19 depict a bubble pump for attachment to a bag of fluid such as liquid hand soap, for use in dispensers such as automatic or manually operated, wall mounted dispensers where users can actuate the pump to receive a single portion discharge of liquid soap for hand washing. The pump is applicable to other pumping applications where unit portions of liquid, fine power, particulate-ladened liquid, and heavily viscous liquids are needed.

Figure 6:
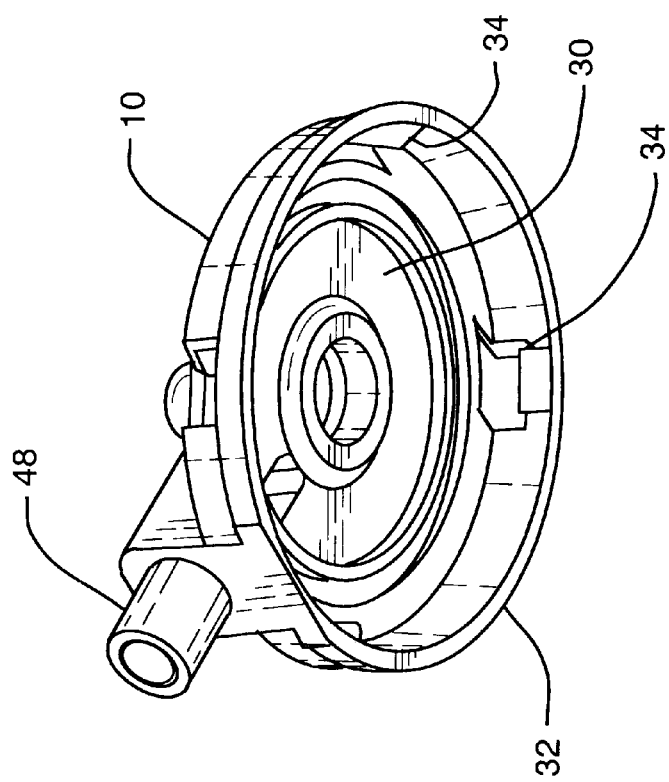
FIG. 6 is a perspective view of the front side of the backplate of the embodiment of FIG. 1, revealing the retaining clips for securing the retainer ring.
Figure 9:
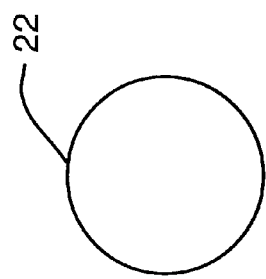
FIG. 9 is the check ball associated with the ball cage of FIGS. 8A and 8B.
Figure 8B:
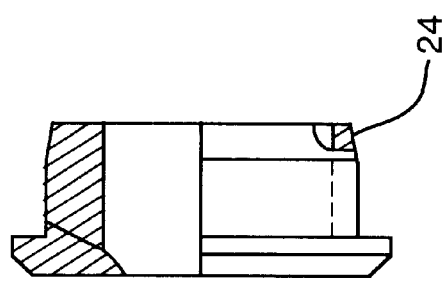
FIGS. 8A and 8B are face and side elevation views of the ball cage element of the backflow check valve assembly that is inserted into the inlet nipple from the face side of the backplate for the embodiment of FIG. 1.
Figure 8A:
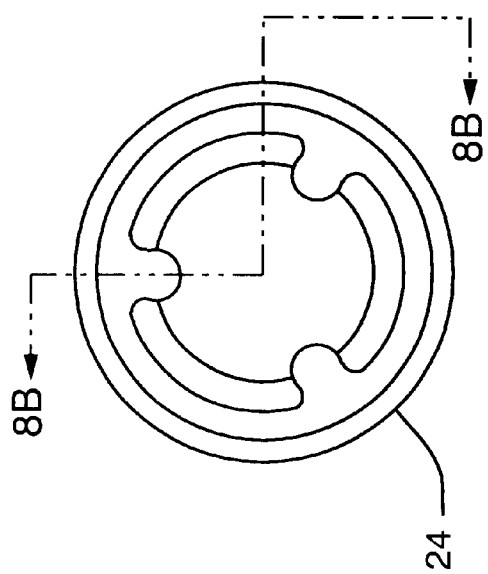
Figure 10:
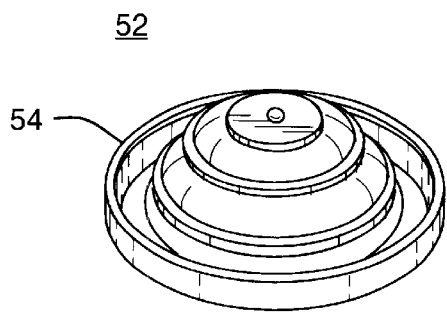
FIG. 10 is a perspective view of the pump diaphragm of the embodiment of FIG. 1.
Figure 11:
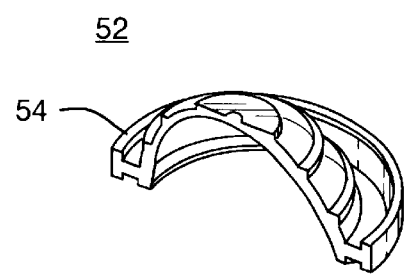
FIG. 11 is a cross section perspective view of the pump diaphragm of FIG. 10, showing the surface profile or contour of the decorative rings on the surface of the pump diaphragm.
Figure 12:
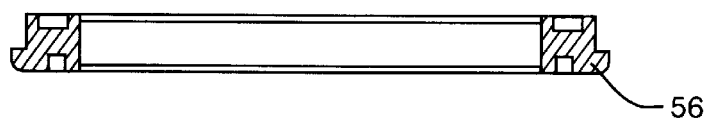
FIG. 12 is a cross section view of the retainer ring of the embodiment of FIG. 1.
Figure 13:
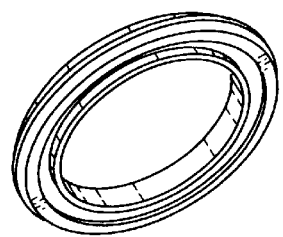
FIG. 13 is an underside perspective view of the retainer ring of FIG. 12.
Figure 14:
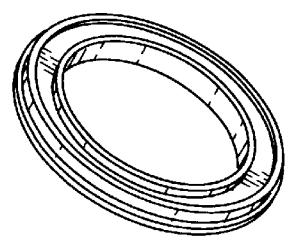
FIG. 14 is a front side perspective view of the retainer ring of FIG. 12.

Referring to the drawings, backplate 10 has a barbed inlet nipple 20 protruding from the center of the backside for attachment to the bag flange, a rim 32 encircling pump cavity back wall 30 on its front side, and four perimeter retention clips 34 which are more apparent in the FIG. 6, for retaining flange 54 of pump diaphragm 52 with retaining ring 56 so as to form pump cavity 50. When the pump and attached bag of fluid are properly installed in a suitable dispenser, the pump is held rigidly in position and the dome or bubble of pump diaphragm 52 is exposed for contact and compression by a press bar, which may be manually or automatically operated for the dispensing of a unit portion of the fluid. In alternative embodiments, the pump diaphragm may be compressed by direct pressure from the user's hand or fingers.

A backflow check valve is formed within inlet 20 by closely confining a back flow check valve ball 22 within equally spaced longitudinal flanges inside inlet nipple 20 between backflow ball seat 26 and back flow check ball cage 24 so that ball 22 seals inlet nipple 20 against backflow ball seat 26 to prevent backflow when pump diaphragm 52 is compressed, but moves forward against the three retainer prongs of cage 24, permitting forward flow of fluid from the bag into pump cavity 50 when pump diaphragm 52 is recovering. Clearance for full fluid inflow around ball 22 is assured by the height of the flanges confining ball 22 within the interior of the nipple. The ball is inserted from the face side of backplate 10; and cage 24 installed with a press fit to form this backflow valve assembly. This backflow valve assembly has been used in the applicant's prior art pump designs. The inlet is concentric to the pump cavity, providing uniform inflow distribution of the soap or other fluid into the pump cavity as the pump diaphragm recovers after having been compressed.

At the lower end of backplate 10 there is an outlet channel 40 terminating at ball seat 46 of outlet nipple 48. Inlet nipple 20 and outlet nipple 48 both communicate with pump cavity 50, providing a flow path from inlet to outlet through pump cavity 50. The intended orientation of the pump diaphragm and cavity of the present embodiment with respect to a dispenser being vertical, so as to present the dome or bubble horizontally for compression, and the fluid being intended to be expelled downward to the user's hands, it is necessary to port the fluid out of the pump cavity in a direction normal to the backplate, and then redirect it ninety degrees to the vertical. There must be incorporated into this right angle fluid flowpath a valve system to prevent flow and leakage except when the pump is actuated. Furthermore, it is important to optimize the flow path and reduce flow resistance in order to achieve the best possible performance of a fluid pump, particularly when the fluid is grit or particulate ladened, or of relatively high or heavy viscosity so as to be more difficult to pump, as are, for example, some types of liquid detergent hand soaps.

To that end, in the preferred embodiment, outlet channel 40 in the figures consists of two sections; el section 42 and straight section 44. Referring specifically to FIGS. 15, 16, 17 and 18, it is well known in the art to form a right angle channel in a molded component by using abutting inserts that are withdrawn at right angles so as to leave a right angle hole or channel through the piece. Outlet channel 40 is formed by use of a backplate mold with an el section insert 72 having a planar face 74 and a fully rounded backside shoulder with a uniform radius. Insert 72 is inserted into the front side of the mold in the lower region of the pump cavity with face 74 facing the nozzle end of the pump. Straight insert 76 is a round rod with a square end, inserted from the nozzle end of the mold for the backplate through the region that will form outlet nipple 48, extending upward so as to contact face 74 of el insert 72. A backplate is thus molded and these inserts withdrawn, leaving outlet channel 40 with an optimally formed el section 42 that horizontally evacuates pump cavity 50 and efficiently redirects the fluid with minimal turbulence and resistance through the right angle turn into vertical straight section 44.

Figure 1:
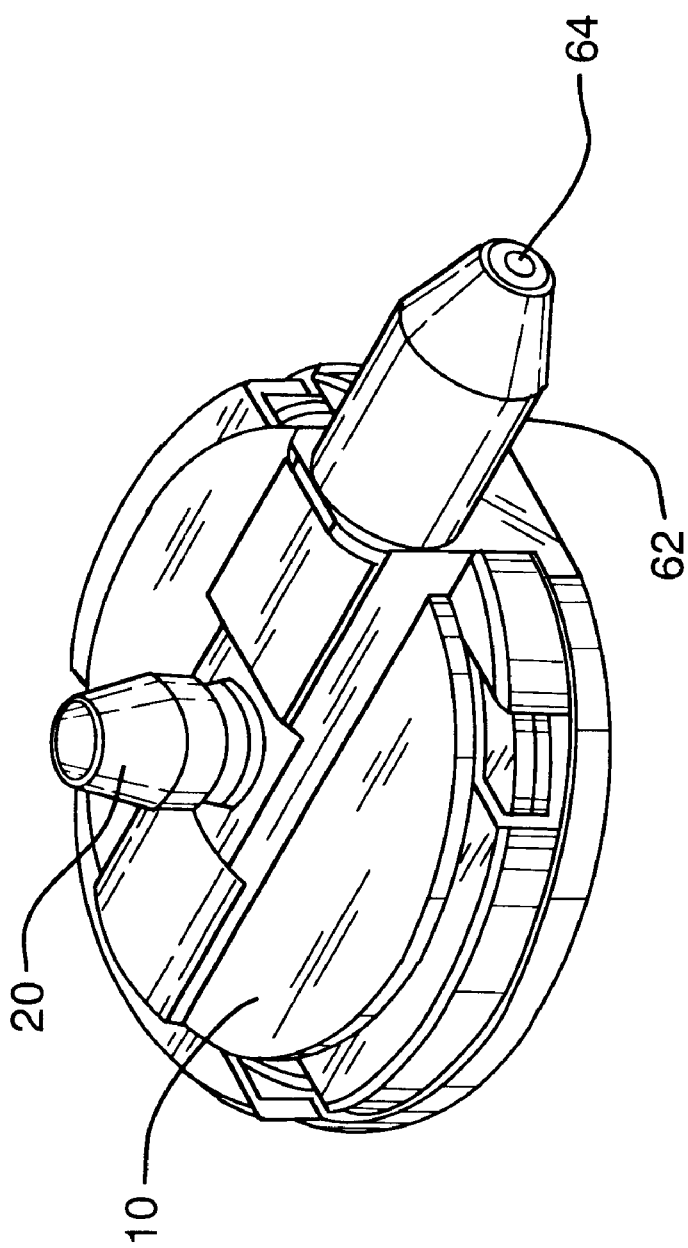
FIG. 1 is a lower right rear perspective view of a preferred embodiment of the invention.
Figure 2:
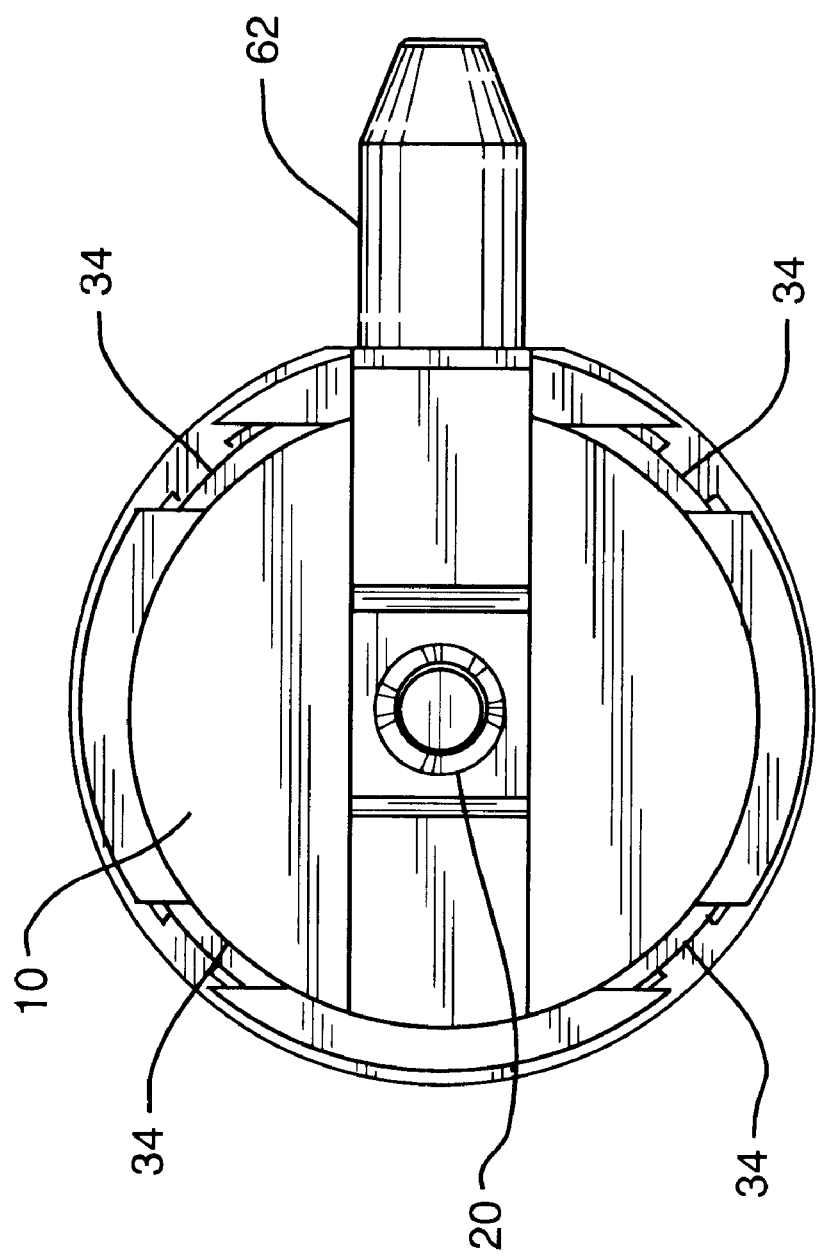
FIG. 2 is a rear elevation of the embodiment of FIG. 1, showing the provision for four point clip retention of the retainer ring and pump diaphragm.
Figure 3:
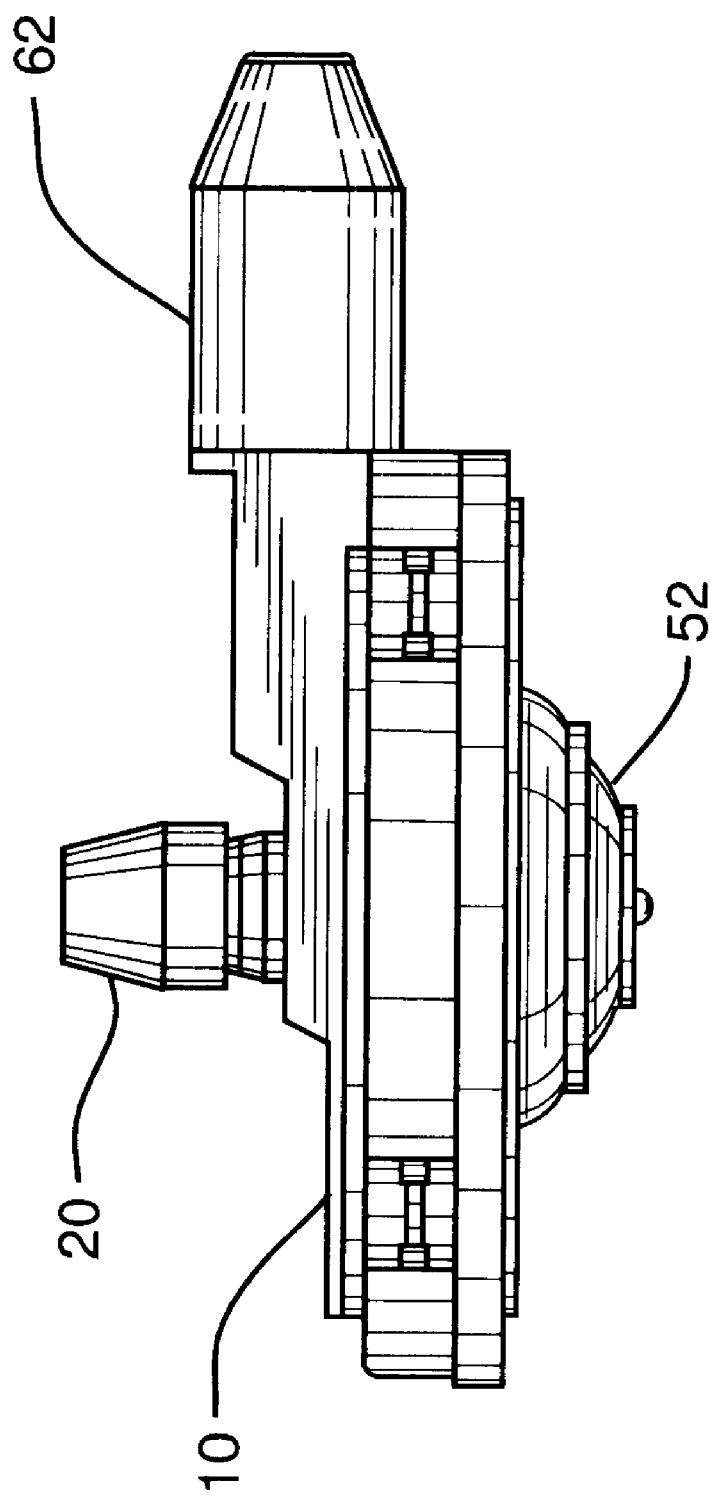
FIG. 3 is a side elevation of the embodiment of FIG. 1.
Figure 4:
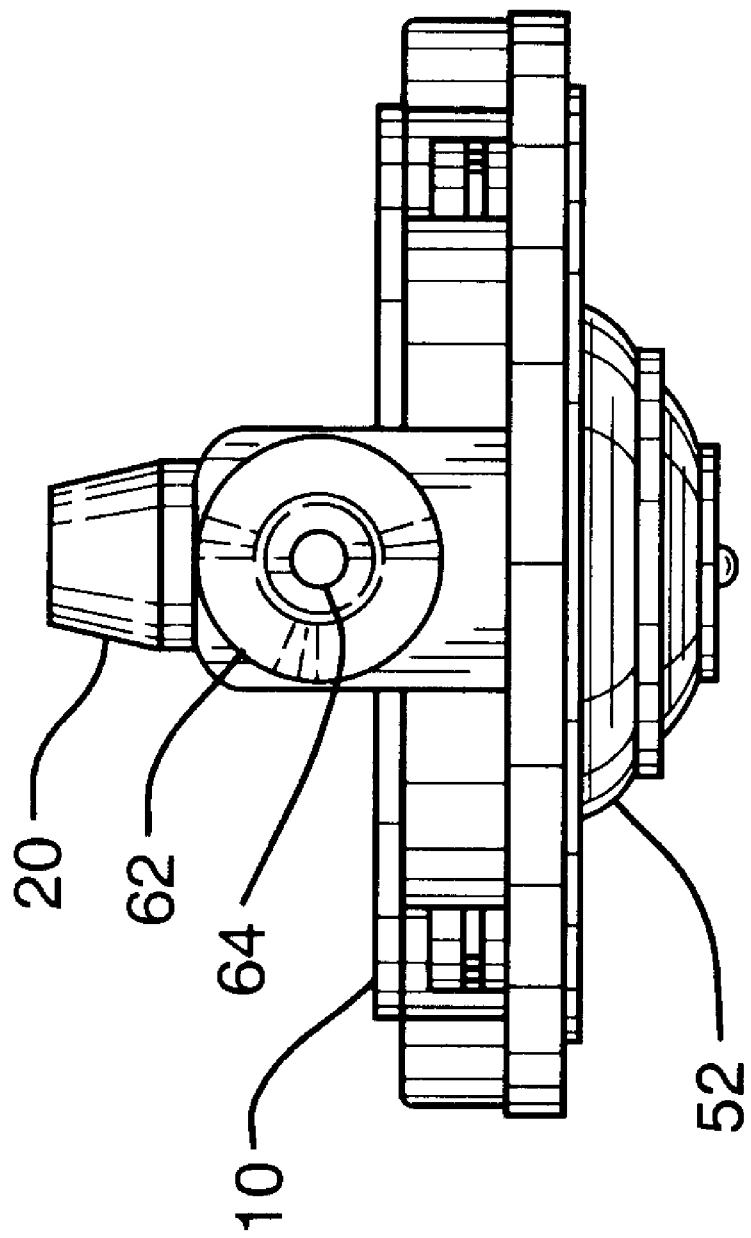
FIG. 4 is a nozzle end view of the embodiment of FIG. 1.
Figure 5:
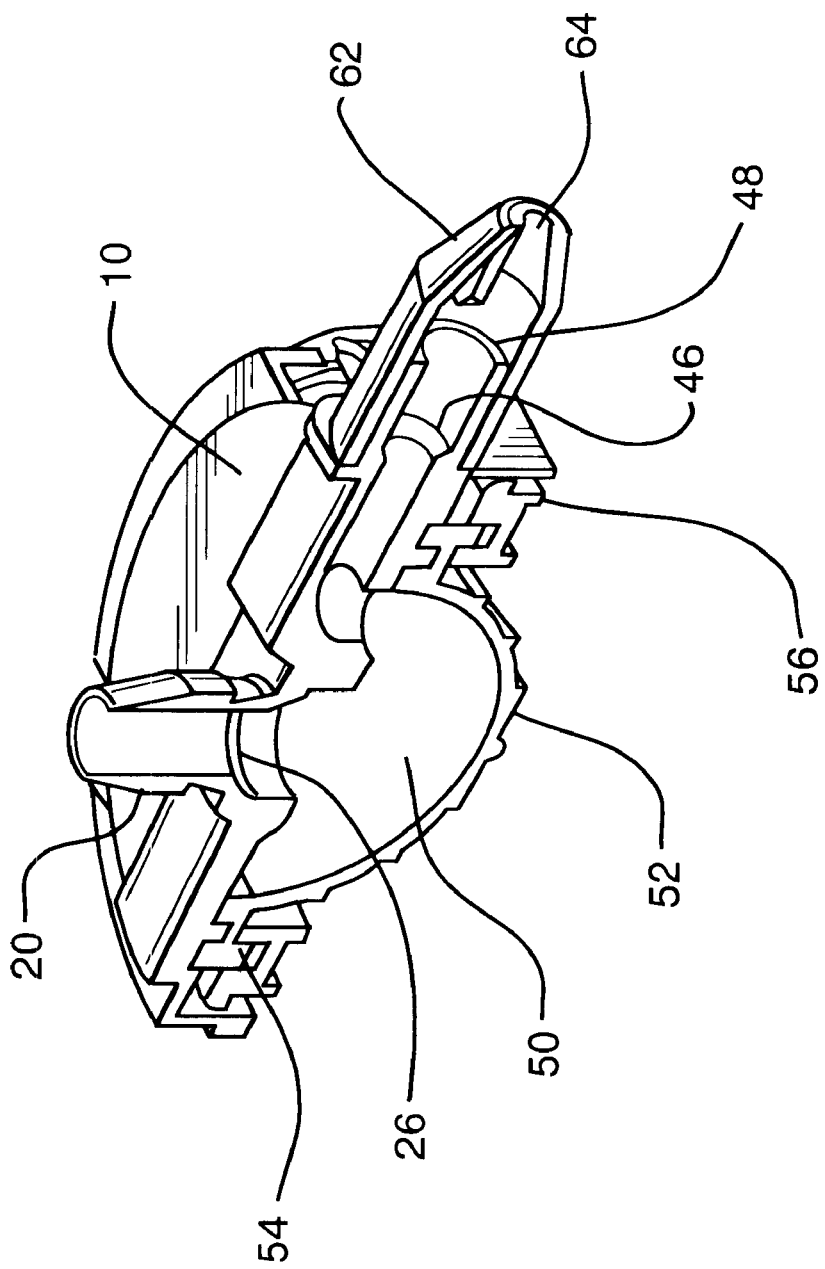
FIG. 5 is a lower right rear longitudinal cross section perspective view of the embodiment of FIG. 1, showing the inlet nipple, pump cavity, outlet channel, and nozzle; omitting the back flow check ball and ball cage, and the outflow ball valve and coil spring assembly.
Figure 7:
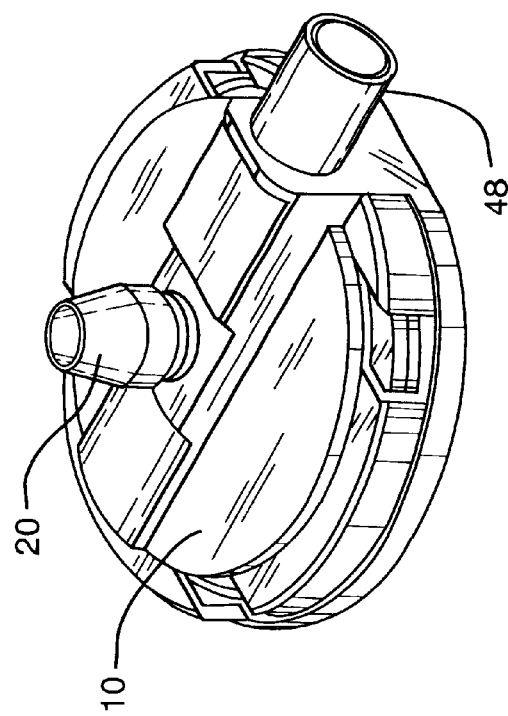
FIG. 7 is a perspective view of the back side of the backplate of FIG. 6, revealing the outlet nipple to which a nozzle assembly is attachable.
Figure 19:
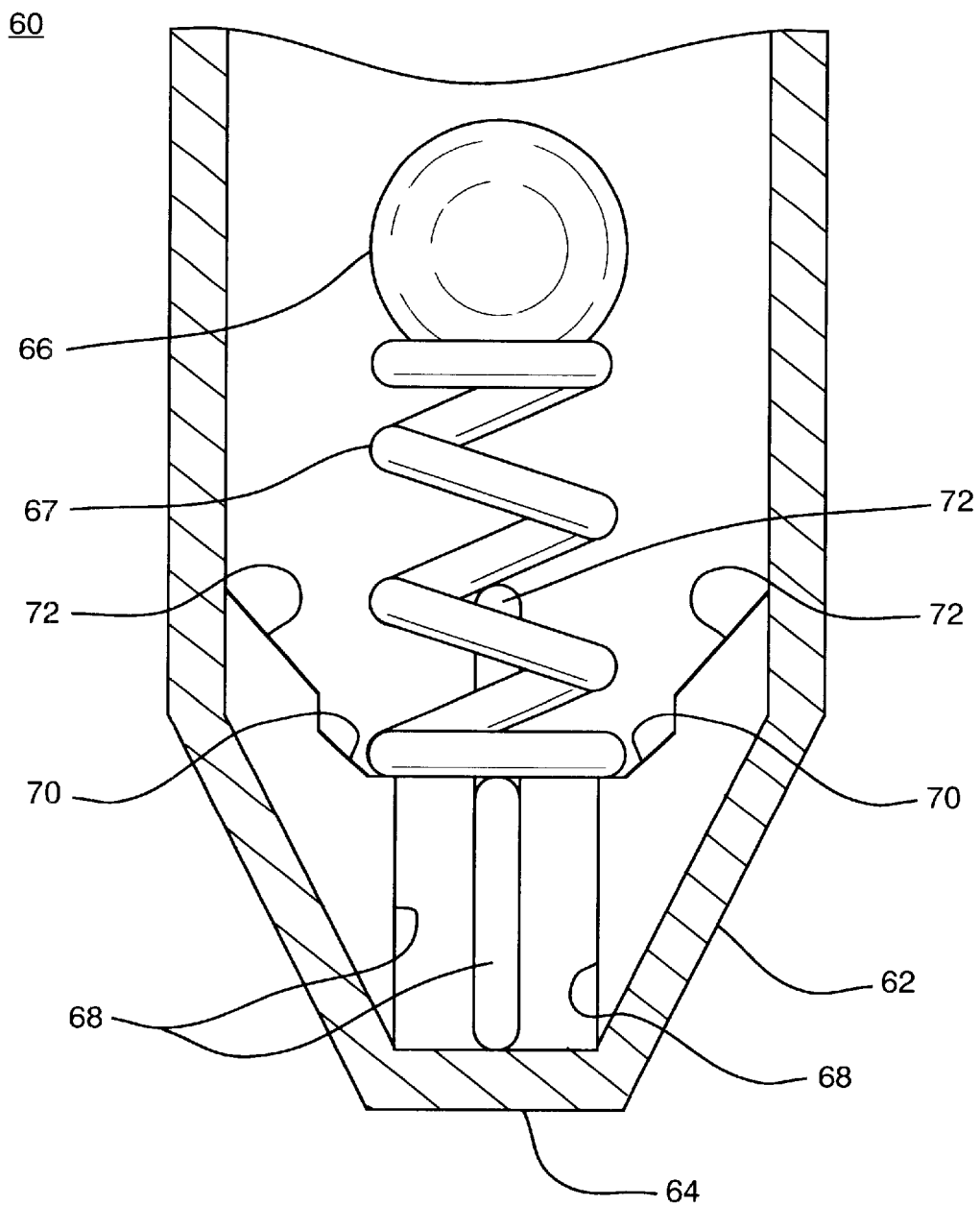
FIG. 19 is a cut away section of the nozzle assembly of the embodiment of FIG. 1, illustrating three of four standoff flanges within the nozzle chamber supporting the spring and ball valve.

Referring specifically to FIG. 19, nozzle assembly 60 consists of a nozzle cap 62 with an open top sized for a closely conforming press fit over outlet nipple 40 of FIGS. 6 and 7, and a tapered or funnel shaped interior volume that terminates at open nozzle tip 64, where the pumped material is finally discharged from the system. Outflow check ball 66 is supported against ball valve seat 42 of outlet nipple 40 of FIGS. 6 and 7 by coil spring 67, which is in turn supported on four equally spaced, radially oriented standoff flanges 68 projecting inward from the interior wall of the nozzle so as to elevate the base of the coil spring up and away from the open nozzle tip 64, the flanges providing fluted channels around spring 67 to open tip 64, rather than through the coils to the open tip of the nozzles of the prior art. The leading edge of standoff flanges 68 are divided into to regions, a notch section 70 in each, which together form a spring support seat, and a sloping section 72, which aids in guiding the spring into its seat during assembly.

Figures 15, 16:
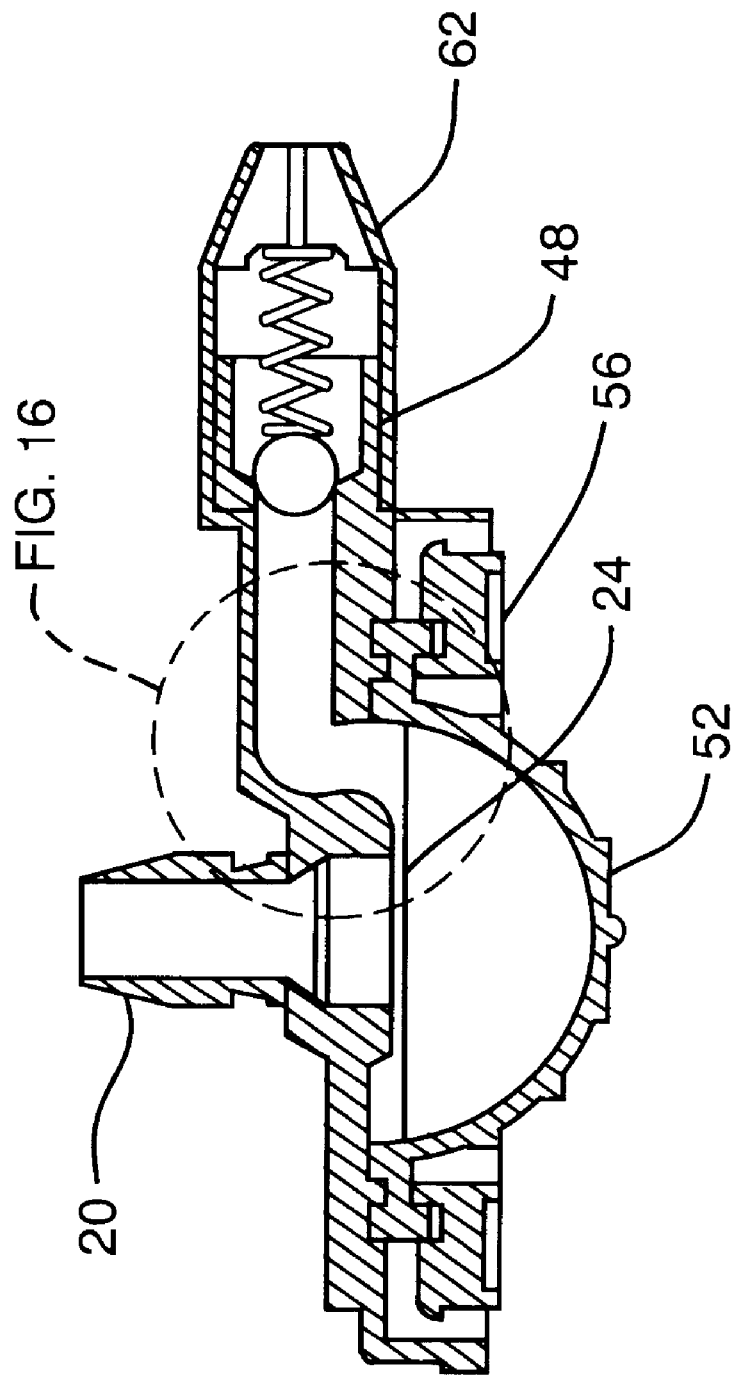
FIG. 15 is a cross section side elevation of the embodiment of FIG. 1, identifying the area of the partial close up view of FIG. 16.
FIG. 16 is a partial cross section view of the embodiment of FIG. 15, showing the outlet channel profile connecting the pump cavity to the outlet nipple and nozzle chamber of the embodiment of FIG. 1.
Figure 16:
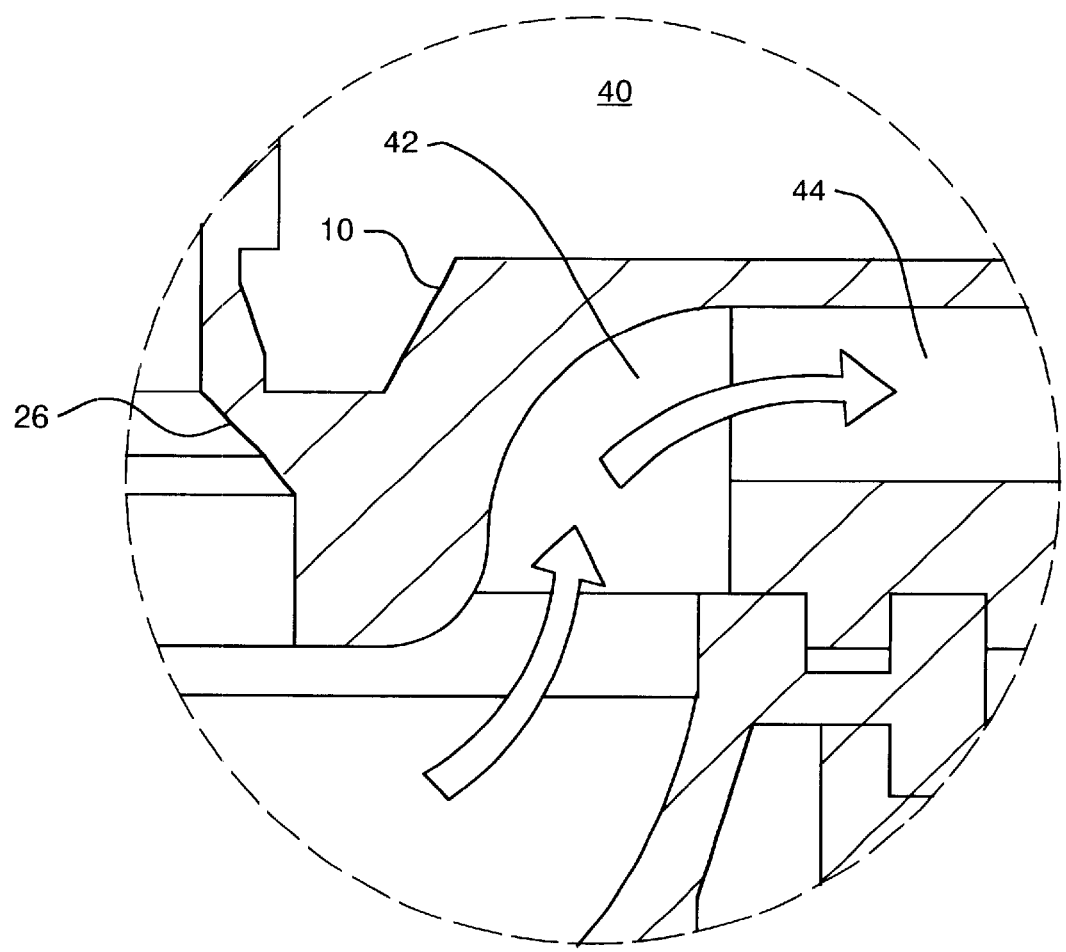
Figure 17:
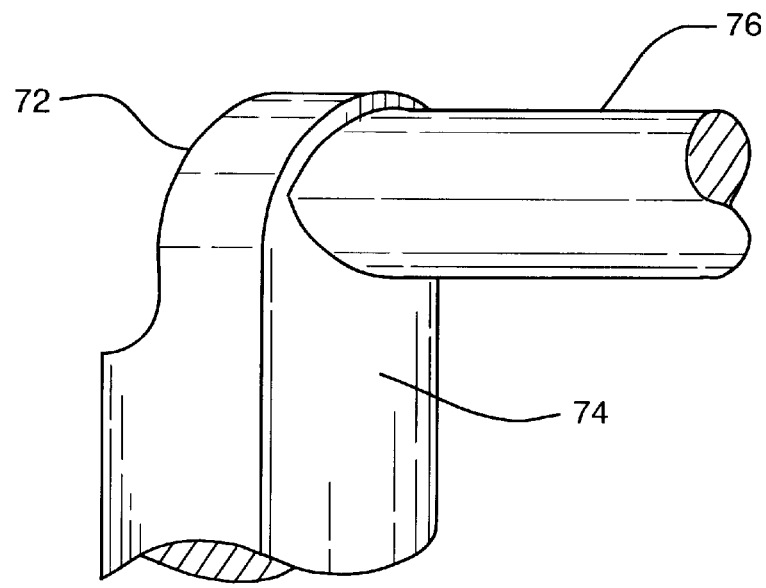
FIG. 17 is a partial view of two inserts of a mold for the backplate used for defining the outlet channel of the embodiment of FIG. 1, illustrating the planar interface of these elements during the molding process.
Figure 18:
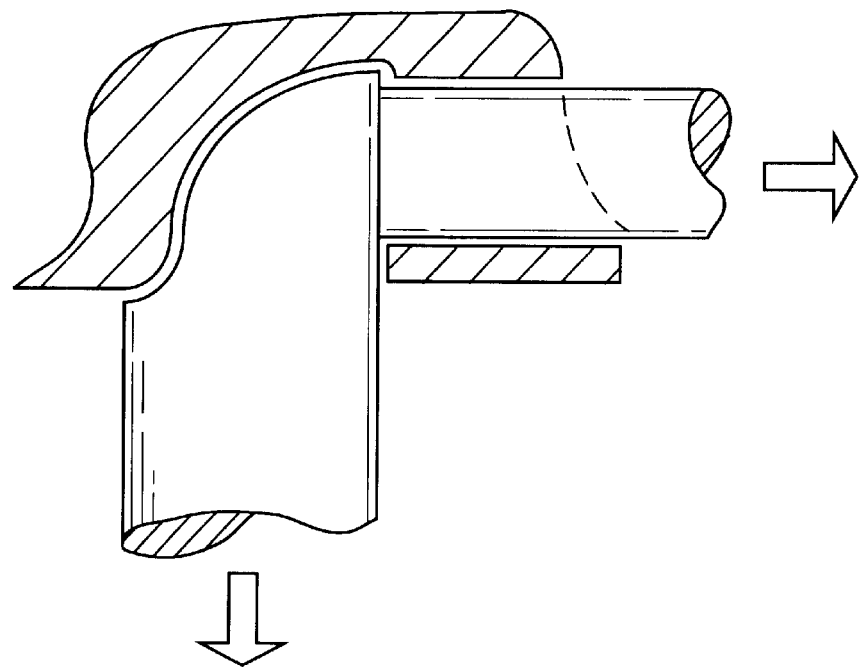
FIG. 18 is a partial view cross section view of the backplate illustrated with the two inserts of FIG. 17 in the outlet channel prior to being draw out in the respective directions indicated by the arrows.

Referring to FIGS. 15, 16, and 19, the primary flow path of fluid from pump cavity 50 through outlet channel 40 to nozzle assembly 60 of the preferred embodiment is readily evident. When compression is applied to pump diaphragm 52 so as to collapse pump cavity 50, the backflow check valve in inlet nipple 20 (not shown in FIG. 15) closes and the fluid in pump cavity 50 is expelled through outlet channel 40, around check ball 66, and vertically downward and out nozzle tip 64. The path of least resistance through the nozzle chamber is around and external of coil spring 66 and down between flanges 68 so as to bypass spring 66. This is distinguished from prior art nozzles that align and support the base of the ball spring at the nozzle tip, so that fluid entering the nozzle chamber is required to penetrate the screenlike windings of coil spring 66 to enter the interior volume or cavity formed by the spring coils to reach the nozzle tip.

In the instant invention, standoff flanges 68 provide a bypass flow path. Further, the standoff flanges 68 are relatively thin and streamlined to minimize any flow restriction or contribution to flow turbulence. The function of the three or four standoff flanges of the preferred embodiment can be supplied by as few as a single flange terminating in a center spring support nipple or cup, or a bridge spanning the chamber with a center spring support nipple or cup. Other alternative embodiments that provide a fluid flow path that avoids the pumped fluid being screened through the windings of a check ball spring, such as a lateral offset between the spring base location and the nozzle tip rather than a vertical spacing, are also within the scope of the invention.

The standoff flange or flanges can be molded into the nozzle assembly, or be a separate unitary part that is placed into the nozzle chamber and held by press-fit or by spring tension after assembly. A further alternative is to provide standoffs incorporated into the spring design or a standoff attachment that secures to the base of the spring prior to assembly. In all cases, the liquid or fluid flow path is improved by optimizing the cross-sectional flow area and minimizing obstructions in the flow path, especially with respect to particulate-ladened or heavily viscous fluids such as grit ladened or granulated hand soaps and lotions that are inherently more difficult to pump than light fluids.

Dome pumps with a rigid backplate are known in the art. It will be readily apparent that a full backplate design provides a rigid backbone to a pump from inlet nipple to nozzle tip, which improves the design and fitment of the pump into a compatible dispenser, as compared to the prior art hose pump designs where the outflow check valve and nozzle tip is flexibly attached to the inlet pump end components by the collapsible pump hose. However, nowhere in the prior art of diaphragm soap pumps of this type has this attention to the details of fluid dynamics and flow path resistance in the fluid path and pump valves been so apparent and so effective in improving the performance of the pump to handle granular or particulate ladened soaps and like fluids.

The foregoing description of the preferred embodiment of the invention has been presented for the purpose of illustration and description. It is not intended to be exhaustive or to limit the invention to the precise form disclosed. Many modifications and variations are possible in light of the above teachings. For example, the illustrated embodiment has an ornamental shape and design that is arbitrary in many respects with regard to the overall appearance of the device, independent of its functionality. It is intended that the scope of the invention be limited not by this detailed description, but rather by the claims appended hereto.

As an example, there is within the scope of the invention, a diaphragm pump and nozzle assembly for dispensing unit portions of a fluid such as liquid hand soap, consisting of a backplate, a pump diaphragm that is attachable to the backplate by clips, cement, a flange or other means so as to form a collapsible pump cavity. The pump has a concentric inlet and a right angle outlet of uniform outer radius, each communicating with the pump cavity. There is a backflow check valve assembly associated with the inlet, and a discharge nozzle assembly connected to the outlet.

The nozzle assembly consists of a nozzle chamber with an open nozzle tip and a spring loaded outflow valve assembly within the nozzle chamber. The outflow valve assembly consists of a check ball seat which may be formed as part of the outlet nipple to which the nozzle assembly is attached, a check ball, and a check ball spring. The assembly is arranged to resist outflow from the pump cavity into the nozzle chamber.

There is also structure within the nozzle chamber for supporting the base of the check ball spring away from the nozzle tip so as to create a fluid flow path from the check ball seat around the check ball and check ball spring and out the nozzle tip. The spring is compressible under fluid pressure so as to move the check ball away from the seat for fluid flow.

As another example, some embodiments may have a nozzle chamber with a tapered profile proximate the nozzle tip. Also, the structure for supporting the check ball spring can be a single standoff flange, or a set of two to four standoffs radially oriented to support the spring, and configured for introducing minimal drag or restriction to fluid flow around the spring base. The flanges may have a downwardly sloping leading edge terminating in a step, so as to form a spring support for the base of the spring.

As yet another example, the chamber has the nozzle tip laterally displaced away the spring base and support, so that it maintains a flow path around the ball and spring to the nozzle tip. And as still another example, the spring end is deformed into a self supporting base structure that has lower resistance to fluid flow than the normal coils, such as an open or extended final turn to the spring wire, oriented to resist compression, and terminating as a support ring that rests against the chamber wall. As even another example, the support structure may be a separate, unitary base member that is attachable to the spring for installation or assembly within the nozzle chamber.

An additional example of the invention is a diaphragm pump and nozzle assembly for dispensing a fluid, consisting of a backplate, a pump diaphragm and means for attaching the diaphragm to the backplate so as to form a collapsible pump cavity. There is an inlet communicating with the pump cavity, with a backflow check valve assembly associated with the inlet. There is a streamlined outlet communicating with the pump cavity, where the edge or junction where the pump cavity wall intersects the outlet channel has a visually noticeable radius or rolled edge to reduce turbulence and provide a smoother, less restricted fluid flow from the pump cavity into the outlet channel. Further, any bends in the outlet channel to the nozzle chamber have fully radiused outside corners rather than sharply edged bore intersections, again to reduce turbulence for a less restricted fluid flow in the outlet channel. There is again a discharge nozzle assembly connected to the outlet according to the invention, as described.

The invention extends to pumps other than diaphragm pumps on a backplate, as will be readily appreciated by those skilled in the art, such as collapsible hose pumps. There is included, for example, a pump and nozzle assembly for dispensing a fluid, consisting of a compressible pump cavity that has an inlet with a backflow check valve assembly, and a streamlined outlet connected to a discharge nozzle assembly. The outlet is streamlined as described above, and the discharge nozzle assembly is as previously described.

The invention is susceptible of other and numerous embodiments, as will be readily apparent to one skilled in the art. For this reason, the preferred embodiment described herein should not be construed as limiting of the scope of the invention as claimed below.

What is claimed is:

1. A diaphragm pump and nozzle assembly for dispensing unit portions of a fluid, comprising
   a backplate,
   a pump diaphragm and means for attachment of said diaphragm to said backplate so as to form a collapsible pump cavity,
   a concentric inlet and a right angle outlet of uniform outer radius, each communicating with said pump cavity,
   a backflow check valve assembly associated with said inlet,
   a discharge nozzle assembly connected to said outlet, said nozzle assembly comprising a nozzle chamber with an open nozzle tip and a spring loaded outflow valve assembly within said nozzle chamber, said outflow valve assembly comprising a check ball seat, check ball, and check ball spring, said assembly arranged to resist outflow from said pump cavity into said nozzle chamber, and means within said nozzle chamber for supporting the base of said check ball spring away from said nozzle tip so as to create a fluid flow path from said check ball seat around said check ball and check ball spring to said nozzle tip, said spring being compressible under fluid pressure so as to move said check ball away from said seat for fluid flow, said nozzle chamber having a tapered profile proximate said nozzle tip, said means for supporting said check ball spring comprising at least one standoff flange within said chamber, said at least one standoff flange being three standoff flanges extending radially inward from the wall of said nozzle chamber, said flanges having a downwardly sloping leading edge terminating in a step, the three said steps forming a spring support for said spring.

2. A diaphragm pump and nozzle assembly for dispensing unit portions of a fluid, comprising a backplate, a pump diaphragm and means for attachment of said diaphragm to said backplate so as to form a collapsible pump cavity, a concentric inlet and a right angle outlet of uniform outer radius, each communicating with said pump cavity, a backflow check valve assembly associated with said inlet, a discharge nozzle assembly connected to said outlet, said nozzle assembly comprising a nozzle chamber with an open nozzle tip and a spring loaded outflow valve assembly within said nozzle chamber, said outflow valve assembly comprising a check ball seat, check ball, and check ball spring, said assembly arranged to resist outflow from said pump cavity into said nozzle chamber, and means within said nozzle chamber for supporting the base of said check ball spring away from said nozzle tip so as to create a fluid flow path from said check ball seat around said check ball and check ball spring to said nozzle tip, said spring being compressible under fluid pressure so as to move said check ball away from said seat for fluid flow, said means for supporting said spring away from said nozzle tip comprising said nozzle tip configured with a lateral displacement with respect to the axis of said spring.

3. A diaphragm pump and nozzle assembly for dispensing unit portions of a fluid, comprising a backplate, a pump diaphragm and means for attachment of said diaphragm to said backplate so as to form a collapsible pump cavity, a concentric inlet and a right angle outlet of uniform outer radius, each communicating with said pump cavity, a backflow check valve assembly associated with said inlet, a discharge nozzle assembly connected to said outlet, said nozzle assembly comprising a nozzle chamber with an open nozzle tip and a spring loaded outflow valve assembly within said nozzle chamber, said outflow valve assembly comprising a check ball seat, check ball, and check ball spring, said assembly arranged to resist outflow from said pump cavity into said nozzle chamber, and means within said nozzle chamber for supporting the base of said check ball spring away from said nozzle tip so as to create a fluid flow path from said check ball seat around said check ball and check ball spring to said nozzle tip, said spring being compressible under fluid pressure so as to move said check ball away from said seat for fluid flow, said means for supporting said spring comprising a unitary base support structure attachable to said spring for assembly within said nozzle chamber.

4. A diaphragm pump and nozzle assembly for dispensing a fluid, comprising a backplate, a pump diaphragm and means for attachment of said diaphragm to said backplate so as to form a collapsible pump cavity, an inlet communicating with said pump cavity, a backflow check valve assembly associated with said inlet, a streamlined outlet communicating with said pump cavity, a discharge nozzle assembly connected to said outlet, said nozzle assembly comprising a nozzle chamber with an open nozzle tip and a spring loaded outflow valve assembly within said nozzle chamber, said outflow valve assembly comprising a check ball seat, check ball, and check ball spring arranged to resist outflow from said pump cavity into said nozzle chamber, means within said nozzle chamber for supporting said check ball spring away from said nozzle tip so as to create a fluid flow path between said check ball seat around said check ball and check ball spring to said nozzle tip, said spring being compressible under fluid pressure so as to move said check ball away from said ball seat and permit fluid flow through said chamber, said means for supporting said check ball spring comprising a multiplicity of radially oriented uniformly spaced standoff flanges within said chamber.

5. A pump and nozzle assembly for dispensing a fluid, comprising a compressible pump cavity, an inlet communicating with said pump cavity, a backflow check valve assembly associated with said inlet, a streamlined outlet communicating with said pump cavity, a discharge nozzle assembly connected to said outlet, said nozzle assembly comprising a nozzle chamber with an open nozzle tip and a spring loaded outflow valve assembly within said nozzle chamber, said outflow valve assembly comprising a check ball seat, check ball, and check ball spring arranged to resist outflow from said pump cavity into said nozzle chamber, means within said nozzle chamber for supporting said check ball spring away from said nozzle tip so as to create a fluid flow path between said check ball seat around said check ball and check ball spring to said nozzle tip, said spring being compressible under fluid pressure so as to move said check ball away from said ball seat and permit fluid flow through said chamber, said means for supporting said check ball spring comprising a multiplicity of radially oriented uniformly spaced standoff flanges within said chamber.

6. A pump and nozzle assembly according to claim 5, said multiplicity of radially oriented uniformly spaced standoff flanges being two standoff flanges.

7. A pump and nozzle assembly according to claim 5, said multiplicity of radially oriented uniformly spaced standoff flanges being four standoff flanges.

8. A pump and nozzle assembly according to claim 5, said multiplicity of radially oriented uniformly spaced standoff flanges being six standoff flanges.

\* \* \* \* \*